(12) United States Patent
Bernard et al.

(10) Patent No.: US 8,554,650 B1
(45) Date of Patent: Oct. 8, 2013

(54) IMPORTABLE TEMPLATE

(75) Inventors: Anthony Bernard, Wexford, PA (US); Timothy P. Choate, McMurray, PA (US); Godwin Gonsalvez, Pittsburgh, PA (US); Dejan Sunderic, Toronto (CA)

(73) Assignee: Ariba, Inc., Sunnyvale, CA (US)

( * ) Notice: Subject to any disclaimer, the term of this patent is extended or adjusted under 35 U.S.C. 154(b) by 2084 days.

(21) Appl. No.: 10/210,898

(22) Filed: Jul. 31, 2002

(51) Int. Cl.
*G06Q 40/00* (2012.01)
*G06Q 30/00* (2012.01)

(52) U.S. Cl.
USPC .............................. 705/35; 705/37; 705/14.71

(58) Field of Classification Search
USPC .......................................... 705/14.71, 35, 37
See application file for complete search history.

(56) References Cited

U.S. PATENT DOCUMENTS

| | | |
|---|---|---|
| 3,581,072 A | 5/1971 | Nymeyer |
| 3,863,060 A | 1/1975 | Rode et al. |
| 4,597,045 A | 6/1986 | Kiuchi |
| 4,674,044 A | 6/1987 | Kalmus et al. |
| 4,789,928 A | 12/1988 | Fujisaki |
| 4,799,156 A | 1/1989 | Shavit et al. |
| 4,845,625 A | 7/1989 | Stannard |
| 4,992,940 A | 2/1991 | Dworkin |
| 5,136,501 A | 8/1992 | Silverman et al. |
| 5,193,056 A | 3/1993 | Boes |
| 5,243,515 A | 9/1993 | Lee |
| 5,297,032 A | 3/1994 | Trojan et al. |
| 5,375,055 A | 12/1994 | Togher et al. |
| 5,394,324 A | 2/1995 | Clearwater |
| 5,402,336 A | 3/1995 | Spiegelhoff et al. |
| 5,606,602 A | 2/1997 | Johnson et al. |
| 5,629,982 A | 5/1997 | Micali |
| 5,640,569 A | 6/1997 | Miller et al. |
| 5,664,115 A | 9/1997 | Fraser |
| 5,684,963 A | 11/1997 | Clement |
| 5,689,652 A | 11/1997 | Lupien et al. |
| 5,715,402 A | 2/1998 | Popolo |
| 5,727,165 A | 3/1998 | Ordish et al. |
| 5,758,327 A | 5/1998 | Gardner et al. |
| 5,758,328 A | 5/1998 | Giovannoli |
| 5,765,138 A | 6/1998 | Aycock et al. |
| 5,774,873 A | 6/1998 | Berent et al. |
| 5,794,207 A | 8/1998 | Walker et al. |

(Continued)

FOREIGN PATENT DOCUMENTS

| | | | |
|---|---|---|---|
| EP | 0399850 A | 11/1990 | |
| JP | 410078992 A | 3/1998 | |

(Continued)

OTHER PUBLICATIONS

Torsten Grabs et al., "Scalable Distributed Query and Update Service Implementation for XML Document Elements," 2001, IEEE, pp. 35-42.*

(Continued)

*Primary Examiner* — Kenneth Bartley
(74) *Attorney, Agent, or Firm* — Van Pelt, Yi & James LLP

(57) ABSTRACT

An importable electronic template and methods of creating and utilizing the importable template. The template includes an alphanumeric field created by a template creation entity and a response field created by the template creation entity. Data is electronically entered into the response field by a responding entity. The importable electronic template is incorporated into a general purpose electronic template.

23 Claims, 8 Drawing Sheets

(56) References Cited

U.S. PATENT DOCUMENTS

| | | | |
|---|---|---|---|
| 5,794,219 | A | 8/1998 | Brown |
| 5,797,127 | A | 8/1998 | Walker et al. |
| 5,799,151 | A | 8/1998 | Hoffer |
| 5,799,285 | A | 8/1998 | Klingman |
| 5,802,502 | A | 9/1998 | Gell et al. |
| 5,803,500 | A | 9/1998 | Mossberg |
| 5,809,483 | A | 9/1998 | Broka et al. |
| 5,826,244 | A | 10/1998 | Huberman |
| 5,832,496 | A | 11/1998 | Anand et al. |
| 5,835,896 | A | 11/1998 | Fisher et al. |
| 5,862,223 | A | 1/1999 | Walker et al. |
| 5,890,138 | A | 3/1999 | Godin et al. |
| 5,897,621 | A | 4/1999 | Boesch et al. |
| 5,905,974 | A | 5/1999 | Fraser et al. |
| 5,905,975 | A | 5/1999 | Ausubel |
| 5,915,209 | A | 6/1999 | Lawrence |
| 5,966,699 | A | 10/1999 | Zandi |
| 6,014,627 | A | 1/2000 | Togher et al. |
| 6,021,398 | A | 2/2000 | Ausubel |
| 6,023,685 | A | 2/2000 | Brett et al. |
| 6,044,363 | A | 3/2000 | Mori et al. |
| 6,055,518 | A | 4/2000 | Franklin et al. |
| 6,058,379 | A | 5/2000 | Odom et al. |
| 6,061,663 | A | 5/2000 | Bloom et al. |
| 6,078,906 | A | 6/2000 | Huberman |
| 6,119,229 | A | 9/2000 | Martinez et al. |
| 6,151,589 | A | 11/2000 | Aggarwal et al. |
| 6,161,099 | A * | 12/2000 | Harrington et al. .......... 705/36 R |
| 6,199,050 | B1 | 3/2001 | Alaia et al. |
| 6,266,652 | B1 | 7/2001 | Godin et al. |
| 6,366,891 | B1 | 4/2002 | Feinberg |
| 6,789,252 | B1 * | 9/2004 | Burke et al. .................. 717/100 |
| 7,194,678 | B1 * | 3/2007 | Koike et al. ................... 715/234 |
| 2001/0032092 | A1 * | 10/2001 | Calver .............................. 705/1 |
| 2001/0044771 | A1 * | 11/2001 | Usher et al. ..................... 705/37 |
| 2001/0056396 | A1 * | 12/2001 | Goino ............................. 705/37 |
| 2002/0035483 | A1 * | 3/2002 | Patel ................................ 705/1 |
| 2002/0059132 | A1 * | 5/2002 | Quay et al. ...................... 705/37 |
| 2002/0062276 | A1 * | 5/2002 | Krueger et al. ................. 705/37 |
| 2002/0065769 | A1 * | 5/2002 | Irribarren et al. ............... 705/37 |
| 2002/0069076 | A1 * | 6/2002 | Faris et al. ........................ 705/1 |
| 2002/0073125 | A1 * | 6/2002 | Bier ............................. 707/530 |
| 2002/0091582 | A1 * | 7/2002 | Palmer et al. ................... 705/26 |
| 2002/0099638 | A1 * | 7/2002 | Coffman et al. ................ 705/37 |
| 2003/0220879 | A1 * | 11/2003 | Gaughan et al. ................ 705/51 |

FOREIGN PATENT DOCUMENTS

| | | |
|---|---|---|
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

Andrews, "Auctions Catch the Interest of Hobbyists and Big Business", Aug. 24, 1998.
Associated Press, "Auction on Web is Buyer's Market", Apr. 6, 1998.
"BroadVision Developing First Interactive Commerce Management System to Support Sales & Marketing Process; New Software Category Necessary to Interactive Network Architecture", Business Wire, p. 5150152, May 15, 1995.
Danny Cohen, "Computerized Commerce", Information Processing 89, Aug. 28-Sep. 1, 1989.
"FairMarket Launches New Self-Serve Auctions", Business Wire, p. 6161495, Jun. 16, 1998.
Clive D. Wrigley, "Design Criteria for Electronic Market Servers", Focus Theme, pp. 12-16.
Wurman, et al. "The Michigan Internet AuctionBot: A Configurable Auction Server for Human and Software Agents", University of Michigan, pp. 301-308.
Martin Reck, "Types of Electronic Auctions", Hochschule St. Gallen, pp. 236-243.
Jahnke, "How Bazaar", CIO Web Business Magazine, Aug. 27, 1998.
Jean-Pierre Banatre, et al., "The Design and Building of Enchere, a Distributed Electronic Marketing System" Communications of the ACM, No. 1, Jan. 29, 1986.
Lee, "Do electronic marketplaces lower the price of goods?", Communications of the PCM, v41n1 pp. 73-80, Jan. 1998.
Malone, et al., "The Logic of Electronic Markets", Harvard Business Review, No. 893II, May-Jun. 1989.
"Moai Technologies Introduces New categories of Business to Business Auction Software . . . ", Business Editors and Computer Writers, Mar. 16, 1998.
Kikuchi, et al., "Multi-Round Anonymous Auction Protocols", IEICE Trans. Inf. & Syst., vol.E82-D, No. 4, Apr. 1999.
"Online bidding software", Electronic Buyers' News, Issue 1072, p. 86, 1/6p, Aug. 25, 1997.
Sairamesh, et al., "Economic Framework for Pricing and Charging Digital Libraries", D-Lip Magazine, Feb. 1996.
"Sold! . . . To the Lowest Bidder", Computer Finance, v6, n2, Jul. 1995.
"Venture Capitalists Fund Two Massachusetts Internet Related Companies", Boston Globe, Jan. 14, 1998.
Vigoroso, "Buyers prepare for brave new world of e-commerce", Purchasing, v126, n6, pS4(1), Apr. 22, 1999.
Von der Fehr, et al., "Predatory bidding in sequential auctions", Oxford Economics Papers, v46, n3, p. 345(12), Jul. 1994.
"What you need to know to bid in FCC's narrowband auction", Washington Telecom News, v2, n26, p6(2), Jun. 27, 1994.
Wilder, "What's Your Bid?—FreeMarkets' real-time online bidding technology lets clients drive downcosts and improve product value", InformationWeek, Nov. 10, 1997.
Woolley, "E-muscle", Forbes, Mar. 9, 1998.

* cited by examiner

Template Preview edit | delete  General Section edit | delete  Choose at least one option            Hints            Up | down
    << Select One >> ▾                                   Up | down
                                   You Should choose at
                                     least one.

remove
locked  Top Level Heading                          Hints            Up | down
template
       Answer this textbox question \*                Please enter some string
       [  ]                                                in this text box.

Minimum       Maximum                      You must enter the
   Length [  ] mm \*  [  ] mm \*                           dimension of this object
   Width  [  ] mm \*  [  ] mm \*
   Height [  ] mm \*

Copyright © 2002 FreeMarkets, Inc  All rights reserved  Disclaimer

100

FIG. 3

IMPORTABLE TEMPLATE

FIELD OF THE INVENTION

The present invention is directed to a template and, in particular, a template that may be locked so that it cannot be altered and imported into a template having elements in addition to the imported template.

BACKGROUND OF THE INVENTION

In using a computer system, data may be entered into spreadsheets, or templates, using a variety of different computer programs. These templates may have two different types of data. First, the templates may receive data that is entered by a party and becomes integrated with that template so that whenever a user accesses the template, the data will be provided. This data may also be locked, or remain permanent, such that a user may not be able to change any of the data.

Second, the template may receive data that is entered by a user, but does not remain with the template. Rather, the user must re-enter or enter new data each time the user accesses the template.

It is believed that, presently, template building software is object based, which implies that the user would create many small templates and piece them together to create an overall template. This software is database centric, where all properties of the templates are stored in a database. It is believed that the algorithms and reliance on computer hardware make its solution unable to scale. Thus, there is a need to develop a system that has less reliance on computer hardware and different algorithms.

SUMMARY OF THE INVENTION

The invention is directed to an importable electronic template executable by a processor. The template includes an alphanumeric field created by a template creation entity and a response field created by the template creation entity. Data is electronically entered into the response field by a responding entity. The importable electronic template is incorporated into a general purpose electronic template by including a reference to the general purpose electronic template in the general purpose electronic template.

The invention also provides a method of creating a general purpose electronic template that includes an importable electronic template, wherein the importable electronic template has a text field and a response field. The method includes inserting a reference to the importable electronic template into a code that creates the general purpose template when executed by a processor, retrieving the locked importable template, and displaying the locked importable template as a portion of the general purpose template.

Accordingly, the invention provides solutions to the shortcomings of prior templates. The templates of the present invention beneficially minimize the time required to create templates because many locked templates can be used to create a general purpose template. The templates of the present invention also beneficially enable searching data across multiple templates related to a standardized portion of a template.

Those of ordinary skill in the art will readily appreciate, therefore, that those and other details, features, and advantages will become further apparent in the following detailed description of the preferred embodiments.

BRIEF DESCRIPTION OF THE DRAWINGS

The accompanying drawings, wherein like reference numerals are employed to designate like parts or steps, are included to provide a further understanding of the invention, are incorporated in and constitute a part of this specification, and illustrate embodiments of the invention that together with the description serve to explain the principles of the invention.

In the drawings:

FIG. 3 is one embodiment of a sample general purpose template with an incorporated importable template;

DETAILED DESCRIPTION

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical computer networks.

Any reference in the specification to "one embodiment" or "an embodiment" means that a particular feature, structure or characteristic described in connection with the embodiment is included in at least one embodiment of the invention. The appearances of phrases such as "in one embodiment" in various places in the specification are not necessarily all referring to the same embodiment.

Templates, in the present invention, refer to electronic forms having elements, such as comments and questions, which may be in fields, as well as blank response fields, and are created by a template creator. The electronic templates are saved in a memory device and may be accessed by responding entities. The responding entities reference the instructions, comments, and questions and provide appropriate responses in the response fields.

Figure 1:
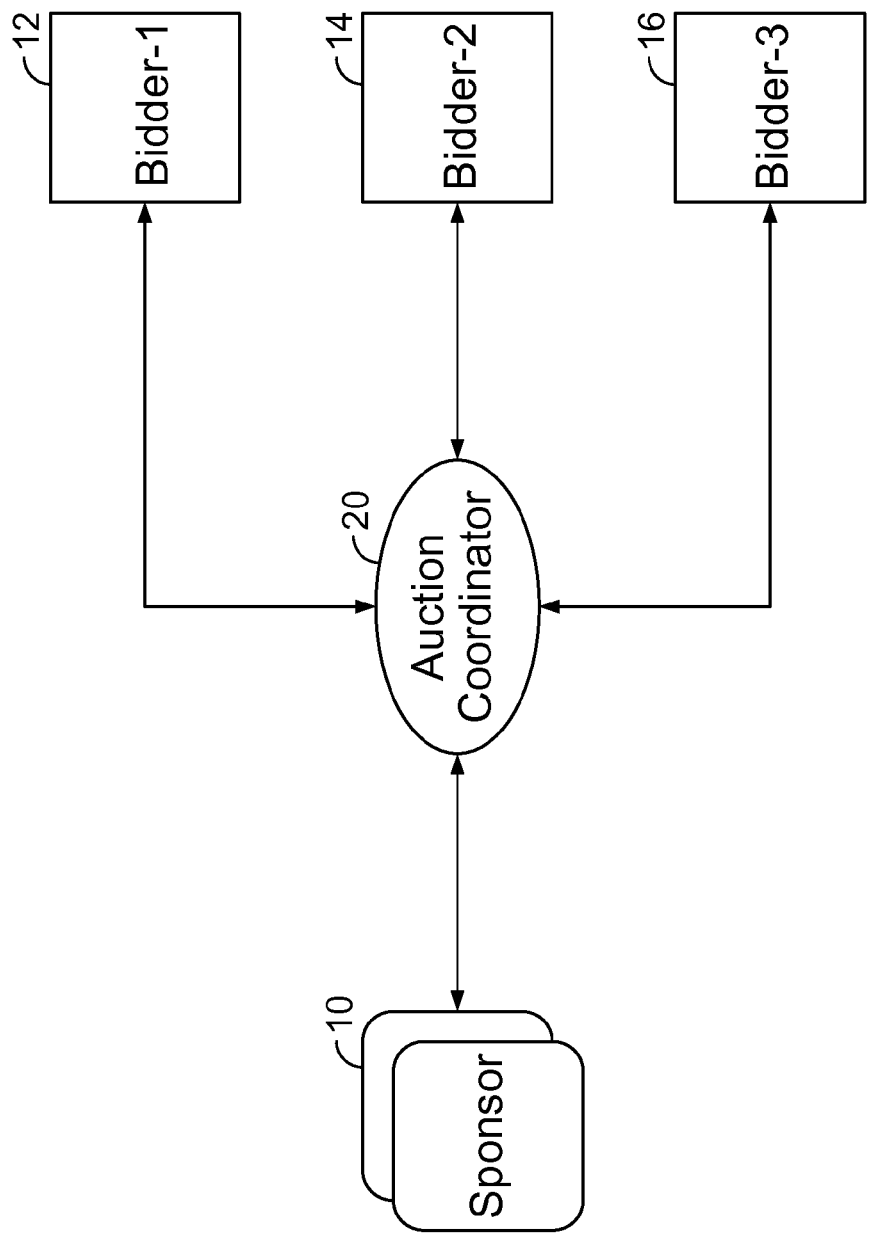
FIG. 1 is a schematic illustration of entities involved in an embodiment of an auction.

Such templates are useful in many applications including, for example, purchaser sponsored or reverse electronic auctions. For example, electronic auctions, as developed by the Assignee of the present invention, are described in U.S. Pat. No. 6,230,146, issued on May 8, 2001, which is hereby expressly incorporated in its entirety by reference. As shown in FIG. 1, in a purchaser sponsored auction, a purchaser, or sponsor, 10 desires to purchase goods and/or services from one or more suppliers 12, 14 and 16 who bid seeking a contract award to provide those goods and/or services. Typically, the purchaser will award a contract to the lowest bidding qualified suppliers 12, 14 and 16. Templates are useful in qualifying suppliers to participate in the auction.

The purchaser sponsor 10 in such a purchaser sponsored auction often compiles a list of qualification requirements prior to the auction. Those qualifications may include specifications for the type and quality of goods to be provided, logistical requirements, and delivery schedule requirements. These requirements may be placed in a template with fields included where responses from potential bidders are to be provided. Information to be inputted into the fields might include, for example, binary confirmation that the potential bidders 12, 14 and 16 are capable of meeting a requirement, numeric information, such as a delivery date, and textual information, such as a location of a factory where the potential bidder will manufacture the desired goods.

Figure 2:
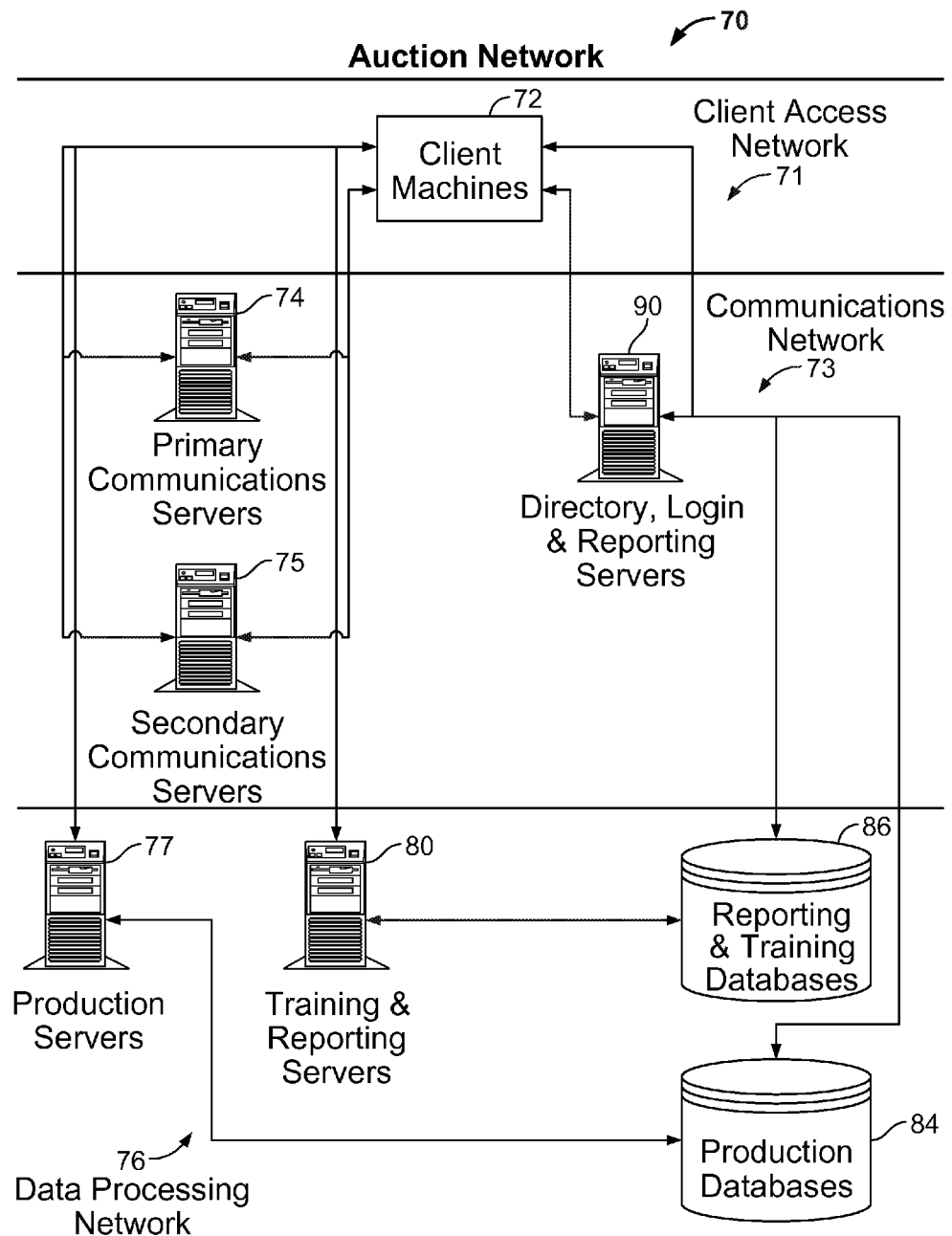
FIG. 2 is a schematic illustration of an embodiment of an auction network.

The template may then be stored at a location in a memory device that is accessible to potential bidders 12, 14 and 16. For example, in an auction network 70, which contains a client access network 71, communication network 73, and data processing network 76, as shown in FIG. 2, the template may be created by a sponsor 10 at the production server 77 or training and reporting server 80 and stored in the production database 84 or the reporting and training database 86. That memory location may, furthermore, be protected by, for example, a password so that only selected potential bidders 12, 14 and 16 are permitted to access the template. The directory, login and reporting servers 90 may act as a portal for access to the auction network 70 and any templates.

Potential bidders 12, 14 and 16 are then invited to access and respond to the templates. Those potential bidders 12, 14 and 16 may, for example, utilize a client machine 72 to access the template through the primary communications servers 74 or secondary communications servers 75. While there are many other uses for the templates of the present invention, the supplier/bidder scenario is utilized as the scenario in which the template of the present invention is utilized in the examples provided herein.

Qualified bidders 12-16 are notified (i.e., via an e-mail) of the start and finish times for the auction. However, the auction may terminate earlier than its intended finish time if, for example, the sponsor 10 so instructs or if the auction coordinator 20 notices illegal actions or irregularities from one or more bidders during the auction. A bidder may be disqualified for any irregularities and blocked from participating in the current as well as future auctions. In that case, the auction may continue, but without the disqualified bidder. On the other hand, an auction may be extended beyond its scheduled finish time if, for example, a bidder has requested such an extension or to accommodate bids received after the official finish time for the auction.

Once the auction commences, each bidder 12-16 may place as many bids as the bidder desires for the price and non-price bid parameters. A client module of communication software on a bidder's computer terminal may provide the necessary communication tool for the bidder to transmit its bids to the bid servers 77, 80. In one embodiment, the bidder may be required to access a pre-designated web site where an auction data entry form or web page may be presented to the bidder to enter that bidder's bid data therein. Alternatively, the data entry form or page may be included as part of the client module of the communication software and may be locally displayed on the bidder's computer terminal without requiring the bidder to access a remote web site. The data entry form displays fields for price and non-price bid parameters where the bidder can enter the bidder's bid using a data entry device such as, for example, a computer keyboard. The production servers 77 receive the bids placed by the bidders 12-16 and forward the received bid data to the bidding software running on the' production servers 77.

The embodiments described herein utilize an online reverse auction, wherein the present invention is performed by a computer processor, as an example. In the online reverse auction, suppliers 12-16 bid to supply goods or services to a purchaser 10 and the purchaser 10 typically purchases the goods or services from the lowest priced qualified bidder 12-16. It is to be understood, however, that the present invention may be used in other applications, such as, most generally, preparing databases, collecting information, requesting data, and any other applications involving entry or display of data. The auction would not necessarily occur online and the present invention may be performed by other than a computer processor.

The present invention may also be utilized in connection with auctions other than reverse auctions. For example, the present invention may be advantageously utilized with forward auctions, wherein the party offering the highest priced qualified bid, rather than the lowest priced qualified bid, is awarded the goods or services being sold. In the case of a forward auction, the leading bid is the highest amount offered and the leading bidder 12-16 is the purchaser party 10 making that highest offer, while in a reverse auction, the leading bid is the lowest amount offered and the leading bidder 12-16 is the supplier party 12-16 making that lowest bid. Similarly, placing a "better bid" in a reverse auction indicates placing a lower bid, while placing a "better bid" in a forward auction indicates placing a higher bid.

The template of the present invention may be imported into a template having elements in addition to the imported template and may also be locked so that it cannot be altered or modified. An importable template is designed for the purpose of being merged into a general purpose template. A general purpose template is a template into which an importable template may be imported. A general purpose template, therefore, typically contains elements such as text or data entry fields in addition to the elements contained in any particular importable template. A general purpose template may contain multiple importable templates and/or multiple occurrences of a single importable template.

Both general purpose templates and importable templates contain two types of data; (i) template creation data that defines such things as elements in the template and is input by the template designer, and (ii) response data that is entered into one or more response fields by a responding entity party to whom the template is provided.

The present invention contemplates two types of importable templates: locked and unlocked. Locked importable templates have template creation data that cannot be changed by the user. Unlocked importable templates have template creation data that can be changed by the user. Importing an unlocked template into a general purpose template may be likened to taking a copy of the unlocked importable template and placing that copy in the general purpose template. The template creation data copied into the general purpose template from the unlocked importable template may be modified by the general purpose template user or creator after importation. Unlocked importable templates provide the benefit of permitting the template creator to copy sections of template creation data into the general purpose template and make modifications rather than recreate all the data contained in the unlocked importable template. Conversely, locked importable templates maintain standards within general purpose templates because they cannot be changed by the creator of the general purpose template.

A locked template offers the advantage of keeping aspects of a general template into which the locked template is imported standard. The aspects of the general template that are maintained as standards are those portions contained in the locked template. An importable template offers the advantage of not having to reenter data contained in a portion of a template that is contained in the importable template repeatedly. Once the data has been entered once into the importable template, it may thereafter be simply entered in a general template by importing the importable template.

Locked importable templates also offer the benefit that response data entered into such a template meet certain standards. Such standard response data may be entered into a database. Because all responses to a locked importable template are provided in response to an unmodifiable and, therefore, identical inquiry, the database containing responses to a particular locked importable template may be searched for one or more characteristics or a range of characteristics. That database may also be searched in conjunction with other responses stored in a database or elsewhere. Such response data may also be formatted in the same way to facilitate searching. For example, the template may ask, among other things, for a company to input the number of years the responding entity has been in business and permit a two digit integer representing years to be entered in a response field of the template. If it is later desired to allow only entities that have been in business to participate as, for example, bidding suppliers 12-16, the template creator can search for all responding entities that have been in business for at least five years in that field and quickly eliminate the remaining suppliers from contention.

In one embodiment, a creator of a locked importable template may be permitted to alter the template creation data in the locked importable template, thereby changing the locked importable template in all general purpose templates in which it exists. In that embodiment, the template, once created, is stored electronically, and completed by a responding entity electronically in a single computer network. The network may, for example, be a local area network, a wide area network, or the Internet and may be a network depicted in FIG. 2. When the locked importable template is inserted into a general purpose template, a link to a single storage area containing the locked importable template is placed in the general purpose template so that every use of the locked importable template in a general purpose template causes those general purpose templates to pull the template creation data associated with the locked importable template from that single storage location. That link may, for example, be a template identification number that is saved in a directory and associated with the memory location in which that locked importable template is stored. Thus, any change made to the template saved at the single storage location is propagated through every general purpose template that draws upon that locked importable template.

In another embodiment, where the locked importable template is copied into general purpose templates, an identifier of each use of a locked importable template may be saved as a use attribute or metadata along with the locked importable template. In an embodiment where such use metadata is utilized, a change in the locked importable template may be propagated to all general purpose templates in which the locked importable template is used. Propagation may be accomplished by accessing each template listed in the modified template use metadata and updating the locked importable template at each of those locations.

In one embodiment, the template creation data is defined in Extensible Markup Language ("XML") and stored in a memory device as XML code. Response data is stored separately in the same or a different database. When a responding entity accesses a general purpose template containing a locked importable template in order to input response data, (i) the general purpose template contains a link to the appropriate XML code for the locked importable template, (ii) the locked importable template XML code is retrieved from the memory device, (iii) the locked importable template is displayed to the responding entity as a portion of the general purpose template, (iv) the responding entity inputs requested response data into predefined fields of the template, and (v) the response data is saved to the database.

Schema 1, as shown below, is a listing of an XML code for a general purpose template that, when executed by a processor, creates a general purpose template that utilizes an importable template. The general purpose template of schema 1 incorporates the importable template of schema 2. A user creates a general purpose template by importing a locked template. As shown in FIG. 3, the imported locked section indicates that it is not able to be edited within this general purpose template by being in a different color, different font, or any other chosen indication. XML Schema 1 depicts the XML of FIG. 3, which represents a general purpose template 100 that references a locked importable template. Details of the locked importable template are later explained in reference to FIGS. 6-8.

XML Schema 1

```
<TEMPLATE>
  <templateInformation>
    <version>0</version>
    <templateName>General Purpose Template</templateName>
    <modifiedBy>{E2206A1D-00E0-1000-006B-
      0A0840328C00}</modifiedBy>
    <referencedBy />
    <importable>N</importable>
    <locked>N</locked>
    <detail>N</detail>
    <description>This will contain a Locked importable
      template.</description>
    <templateID>75</templateID>
  </templateInformation>
  <templateElement>
    <questionLocation>1</questionLocation>
    <questionType>H</questionType>
    <questionText>
      <questionLabel language="EN">General Section</questionLabel>
      <questionLabel language="FR">FR</questionLabel>
      <questionLabel language="DE">DE</questionLabel>
      <questionUOM />
      <uomID />
      <uomConvME />
      <uomConvEM />
      <uomTextEng />
      <uomTextMet />
    </questionText>
    <questionGUID>834</questionGUID>
  </templateElement>
  <templateElement>
    <questionLocation>2</questionLocation>
    <questionType>SL</questionType>
    <questionText>
      <questionLabel language="EN">Choose at least one
        option</questionLabel>
      <questionLabel language="FR">FR</questionLabel>
      <questionLabel language="DE">DE</questionLabel>
      <questionUOM />
      <uomID />
      <uomConvME />
      <uomConvEM />
      <uomTextEng />
      <uomTextMet />
    </questionText>
    <optionList>
      <option>
        <detailInfo>
          <linkTo />
          <linkEqual />
        </detailInfo>
        <optionText>
        <optionLabel language="EN">Option 1</optionLabel>
        <optionLabel language="FR">FR</optionLabel>
        <optionLabel language="DE">DE</optionLabel>
        </optionText>
        <optionID>836</optionID>
```

XML Schema 1

```xml
        </option>
        <option>
            <detailInfo>
                <linkTo />
                <linkEqual />
            </detailInfo>
            <optionText>
                <optionLabel language="EN">Option 2</optionLabel>
                <optionLabel language="FR">FR</optionLabel>
                <optionLabel language="DE">DE</optionLabel>
            </optionText>
            <optionID>837</optionID>
        </option>
        <option>
            <optionText>
                <optionLabel language="EN">Option 3</optionLabel>
                <optionLabel language="FR">FR</optionLabel>
                <optionLabel language="DE">DE</optionLabel>
            </optionText>
            <detailInfo>
                <linkTo />
                <linkEqual />
            </detailInfo>
            <optionID>838</optionID>
        </option>
    </optionList>
    <validationType />
    <requiredFlag>off</requiredFlag>
    <hintText>
        <hintLabel language="EN">You should choose at least
            one.</hintLabel>
        <hintLabel language="FR">FR</hintLabel>
        <hintLabel language="DE">DE</hintLabel>
    </hintText>
    <questionGUID>835</questionGUID>
    </templateElement>
    <templateElement>
        <questionLocation>3</questionLocation>
        <questionType>IM </questionType>
        <templateReference>74</templateReference>
        <questionGUID>839</questionGUID>
    </templateElement>
</TEMPLATE>
```

Figure 4:
FIG. 4 is one embodiment of a sample importable template.

Schema 2, as shown below, is a listing of an XML code for an importable template that, when executed by a processor, creates an importable template. The importable template may be incorporated into a general purpose template as shown in connection with Schema 1. The importable template may be either a locked or unlocked importable template. The template 102 created by the code in Schema 2, which is shown in FIG. 4, is a locked template.

XML Schema 2

```xml
<TEMPLATE>
    <templateInforrnation>
        <version>0</version>
        <templateName>Patent Example</templateName>
        <modifiedBy>{E2206A1D-00E0-1000-006B-
            0A0840328C00}</modifiedBy>
        <referencedBy>
            <referenceID>75</referenceID>
        </referencedBy>
        <importable>Y</importable>
        <locked>Y</locked>
        <detail>N</detail>
        <description>Locked Importable Template.</description>
        <templateID>74</templateID>
    </templateInformation>
    <templateElement>
        <questionLocation>1</questionLocation>
        <questionType>H</questionType>
        <questionText>
            <questionLabel language="EN">Top Level
                Heading</questionLabel>
            <questionLabel language="FR">FR</questionLabel>
            <questionLabel language="DE">DE</questionLabel>
            <questionUOM />
            <uomID />
            <uomConvME />
            <uomConvEM />
            <uomTextEng />
            <uomTextMet />
        </questionText>
        <questionGUID>825</questionGUID>
    </templateElement>
    <templateElement>
        <questionLocation>2</questionLocation>
        <questionType>SI</questionType>
        <questionText>
            <questionLabel language="EN">Answer this textbox
                question</questionLabel>
            <questionLabel language="FR">FR</questionLabel>
            <questionLabel language="DE">DE</questionLabel>
            <questionUOM />
            <uomID />
            <uomConvME />
            <uomConvEM />
            <uomTextEng />
            <uomTextMet />
        </questionText>
        <validationType>String</validationType>
        <requiredFlag>on</requiredFlag>
        <hintText>
            <hintLabel language="EN">Please enter some string in this text
                box.</hintLabel>
            <hintLabel language="FR">FR</hintLabel>
            <hintLabel language="DE">DE</hintLabel>
        </hintText>
        <questionGUID>826</questionGUID>
        <range>
            <minimumMet />
            <maximumMet />
            <minimumEng />
            <maximumEng />
            <minimum />
            <maximum />
        </range>
        <precision />
        <detailInfo>
            <linkTo />
            <linkEqual />
        </detailInfo>
        <uom>-1</uom>
        <uomTextEng />
        <uomTextMet />
        <uomConvME />
        <uomConvEM />
    </templateElement>
    <templateElement>
        <questionLocation>3</questionLocation>
        <questionType>MM</questionType>
        <questionText>
            <questionLabel language="EN">Length</questionLabel>
            <questionLabel language="FR">FR</questionLabel>
            <questionLabel language="DE">DE</questionLabel>
            <minID>828</minID>
            <maxID>829</maxID>
            <questionUOM>mm</questionUOM>
            <uomID />
            <uomConvME />
            <uomConvEM />
            <uomTextEng />
            <uomTextMet />
        </questionText>
        <questionText>
            <questionLabel language="EN">Width</questionLabel>
            <questionLabel language="FR"> FR</questionLabel>
            <questionLabel language="DE">DE</questionLabel>
```

-continued

XML Schema 2

```
    <minID>830</minID>
    <maxID>831</maxID>
    <questionUOM>mm</questionUOM>
    <uomID />
    <uomConvME />
    <uomConvEM />
    <uomTextEng />
    <uomTextMet />
  </questionText>
  <questionText>
    <questionLabel language="EN">Height</questionLabel>
    <questionLabel language="FR">FR</questionLabel>
    <questionLabel language="DE">DE</questionLabel>
    <minID>832</minID>
    <maxID>833</maxID>
    <questionUOM>mm</questionUOM>
    <uomID />
    <uomConvME />
    <uomConvEM />
    <uomTextEng />
    <uomTextMet />
  </questionText>
  <validationType />
  <requiredFlag>on</requiredFlag>
  <hintText>
    <hintLabel language="EN">You must enter the deminsion of this
        object.</hintLabel>
    <hintLabel language="FR"> FR</hintLabel>
    <hintLabel language="DE">DE</hintLabel>
  </hintText>
  <questionGUID>827</questionGUID>
  </templateElement>
</TEMPLATE>
```

The XML structure of Schema 1 and Schema 2 is an example of how a locked template is referenced from another template. The locked importable template appears as a templateElement node in the XML structure of Schema 1, which is the XML Schema for the general purpose template. Since this is only a reference, the actual XML of the locked template is seen in Schema 2. A templateElement is a node in the XML schema that represents any question or imported locked template. Each question style (i.e., checkbox, text box, radio button, geography, min/max, and select list) has its own question type code. This code can be seen in the schemas questionType node. A reference to a locked importable template has a special question type of 'IM', as may be seen toward the end of Schema 1. The "IM" question type designates that the general purpose template is referencing an importable template. A series of templateElements are included in Schema 1 and labeled as such. Within the templateElement block in Schema 1, there is a node named templateReference that designates which template is being imported into the general purpose template. The reference number associated with the templateReference 74 identifies the template of Schema 2. As may be seen by reference to Schema 2, the templateID is identified as 74.

Schema 2 is the XML for an importable template that is to be imported into the general purpose template of Schema 1. The XML of Schema 2 is in a format similar to a general purpose template, however, when a template that imports the template of Schema 1 is rendered, the imported template is accessed and the templateElements of the imported template are rendered as if they were part of the general purpose template. This gives the impression that the imported template is part of the importing general purpose template because there are no visual differences between template creation data on the importing general purpose template and the template creation data imported from the importable template.

In another embodiment, the template creation data is stored in a relational database, such as a Microsoft® SQL Server. This solution eliminates the use of XML. The embodiment has similar functionality to the solution using XML, except that the data contained in the XML is stored in a relational database. The rendering of the templates is also treated differently. Implementations utilizing XML also utilize a XSL transformation, while implementations using the relational database require a rendering object to interrupt the data returned from the database. The details of the rendering object are dependent on the code base of the application. For instance, if the code base was Microsoft® C#, the rendering object may be a class or set of classes that interrupt the data and render the correct controls onto the page.

A relational database implementation would also further facilitate flexibility of the templates created. A database facilitates customizing because columns in a database table may be ignored if they are null (empty). This is not possible with an XML structure because the outer node of the XML must be present. This implementation facilitates more scalable internationalization due to the nature of a relational database. Relational databases allow for tables to have multiple language representations of the same data based on the same Ids. Therefore, with the addition of a language identifier the database may return data in any language that is supported by the application.

The XML implementation templates may be imported as locked or unlocked, while the relational database implementation templates are imported (attached) in only one manner. However, attached templates may still be automatically updated as in the XML implementation. This is accomplished through a versioning style, which is synonymous with locked and unlocked. The versioning styles include smart versioning and simple versioning. If a template is 'smart' versioned then it will behave identical to a locked template. If the attached template is 'simple' versioned than it will act according to the rules defined by an unlocked template. Smart versioning is only applicable to implementations that utilize a relational database. A smart-versioned template may be automatically updated when a new version is published (made available for general use). A simple versioned template will not be updated. Simple-versioned instances will always reflect the version of the template at the time it was created no matter how many versions of the template are created. Smart version templates may be used to standardize sections or template types, while simple-versioned templates may maintain a snapshot, which may be used in such instances as legal agreements.

Figure 5:
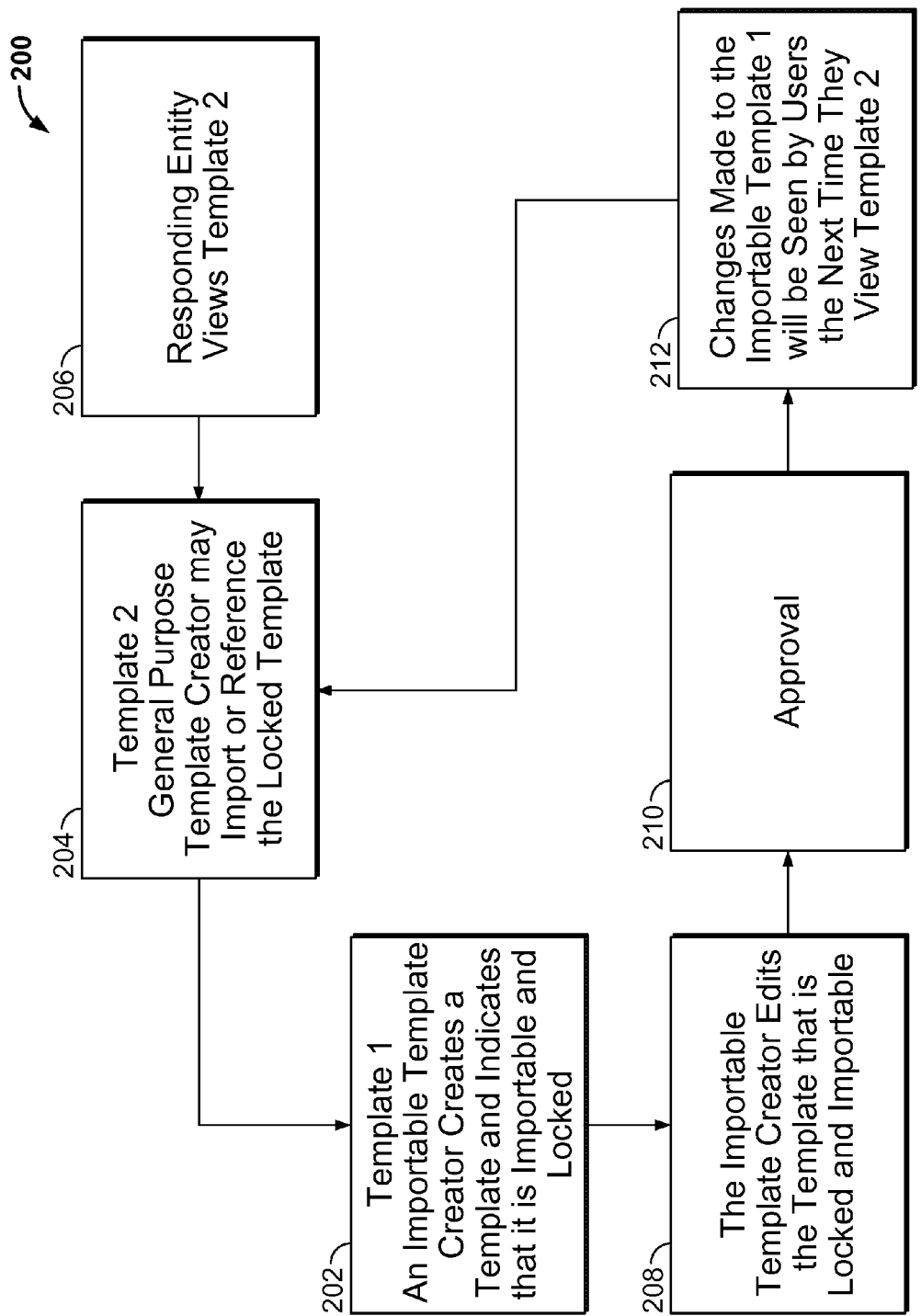
FIG. 5 is a flow diagram of creation, use and modification of a locked importable template.

FIG. 5 illustrates a template creation, use, and modification flow chart 200. At 202, an importable template creator creates Template 1 and indicates that it is importable and locked. Two classes of template creators exist in the present embodiment: a general purpose template creator that has authority to create general purpose templates that may include both locked and unlocked importable templates and a locked importable template creator that has authority to create and modify locked importable templates. A third class of template creator may also be established to approve modifications to locked importable templates. It should be noted that one person may have authority in more than one class.

At 204, a general purpose template creator incorporates locked importable Template 1 into general purpose Template 2. At 206, a responding entity views general purpose Template 2. At 208, an importable template creator edits Template 1. At 210, approval is provided to propagate the proposed change made at 208 through all general purpose templates incorporating locked importable Template 1. At 212, approved edited Template 1 is propagated to all general purpose templates incorporating Template 1. Accordingly, general purpose Template 2 is modified and any responding entity that views Template 2 thereafter will see Template 2 with the modifications made to Template 1 at 208.

When a template is edited, the new version may replace the previous version, or the new version may be saved in a memory device as a separate version to facilitate reversion to a previous version. The latest version may always be the version provided to general purpose templates incorporating the locked importable template.

As discussed above, FIG. 3 illustrates a general purpose template containing a locked importable template. This general purpose template is created for use in a request for information related to the purchase of goods or services in an auction. The template, furthermore, includes an importable template and that importable template is locked in this embodiment. The locked importable template is a block that has been inserted into the general purpose template. The locked importable template block contains elements. These elements include a section header, a textbox question and minimum and maximum questions. Other elements that may be present in a template include, for example, radio button questions that would be posed to responding entities and response fields in which responses may be entered by responding entities.

Templates may be provided with unique identifiers by way of which, for example, an importable template may be referenced in a general purpose template and by way of which an importable template may be imported into a general purpose template. Elements within the template may be provided with unique identifiers as well. Thus, for example, a response field in a locked importable template may have a unique identifier that is associated with that field every time response data for that field is received. A separate owner identifier may also be associated with each field. That owner identifier will be the same for every response entered into any field in a particular template by that responding entity and may be the same for every response entered into any field in any template by that responding entity. Therefore, a particular field of a template may be searched across all of responding entities by searching respondent entries having the element identifier associated with that field. Moreover, a particular field of a locked importable template may be searched across a range of responding entities by searching respondent entries with the element identifier associated with that field and a range of owner identifiers.

A template may be stored in a database to improve retrieval speed over storage in a file system. A template may also be stored in a database to provide additional flexibility over file systems in the backup process. Storing the XML in a database also allows for easy collection of additional data regarding the template. This data may be used for searching or reporting. In addition, there may be other uses for additional data.

In one embodiment, the template is stored in XML format, however, the template may alternately be stored in another source code or an object code format. The template may be stored in the database as a text field of unspecified size so that the template code can be modified and can grow as needed. For example, the template may be stored as a database context, for example, as a text blob in Microsoft® SQL Server 2000™. A "text blob" is a common name for the SQL Server 'text' data type, which may be used to store XML for large amounts of text.

Tables may be required to support the database structure for the template and the tool to search responses given by a responding entity. For example, the template detail table, as shown in Table 1, is a table in which the XML Schema are stored. Each change to a general purpose template or an importable template would be written to this table. Responses provided by a responding entity are stored in the AttrValue table, as shown in Table 2. Metadata that is collected about the template is stored in a Template table, as shown in Table 3. This data includes whether it is an importable, locked, unlocked or general purpose template. Whenever there is a list of templates, it is retrieved from this table. Other tables, including Tables 3, 4, and 5, are used for reference or desired functions.

TABLE 1

Template

| | |
|---|---|
| PK | Template Id |
| PK | Version |
| | Template_Xml |

TABLE 2

AttrValue

| | |
|---|---|
| PK | Template Id |
| PK | Attr Id |
| PK | Owner ID |
| | Attr_Value |
| | Instance_Id |

TABLE 3

Template

| | |
|---|---|
| PK | Template Id |
| | name |
| | description |
| | last_modified |
| | modified_by |
| | template_type |

TABLE 4

Attr

| | |
|---|---|
| PK | AttrId |
| | AttrName |
| | Instance_Id |

TABLE 5

AttrValueDeleted

| | |
|---|---|
| PK | Template Id |
| PK | Attr Id |
| PK | Owner Id |
| | Attr_Value |
| | Instance_Id |

TABLE 6

AttrValueSearch

| | |
|---|---|
| PK | Template Id |
| PK | Attr Id |
| PK | Owner Id |
| | Attr_Value |
| | Instance_Id |

TABLE 7

AttrValueDeleted

| PK | Owner Id |
| --- | --- |
| | Template_Id |
| | Template_Status |

Figure 6:
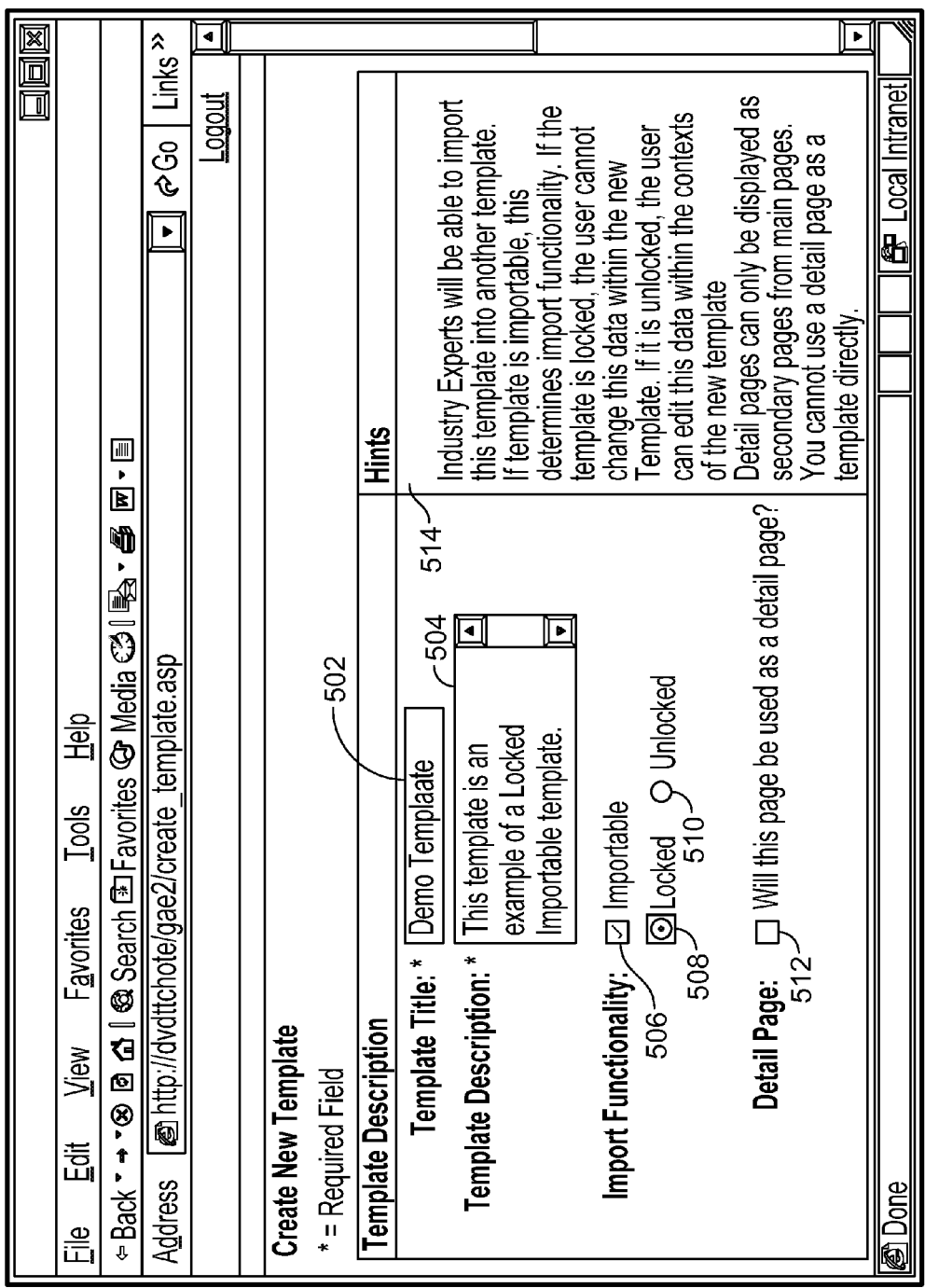
FIG. 6 is a sample template creation screen display used to practice an embodiment of the invention.

FIG. 6 is a sample template creation screen display 500 for an embodiment of the present invention. This screen 500 may be used to create a general purpose template or an importable template and an importable template created through this screen may be either locked or unlocked. At 502, a title is entered for the template. When the template is stored, the title is stored in a directory so that users may identify templates by title. As indicated at 502 by the asterisk, a title is a field that is required to be entered by the template creator. At 504, a description of the template being created is entered. That description may briefly indicate, for example, the purpose of the template or the type of use for which the template is intended. The template description may also be viewed by potential users when the template title is selected. As indicated at 504 by the asterisk, a template description is also a field that is required to be entered by the template creator.

Import functionality of the sample template creation screen display 500 is defined at 508, 510, and 512. At 508, a binary selectable area or "check box" appears next to the word "Importable." If the template being created is intended to be an importable template, the box in this embodiment is selected and a check appears to indicate that it is importable. If the template being created is not intended to be an importable template, the box in this embodiment is either not selected or is deselected and a blank box appears to indicate that the template is not importable. If a non-importable file is indicated at 506, the "Locked" and "Unlocked" selection areas at 508 and 510 are not selectable because locking and unlocking is only applicable to importable templates. If, however, an importable template is indicated at 506, then either the locked selection area of 508 or the unlocked selection area at 510 must be selected. In this embodiment, when "Locked" is selected at 508, "Unlocked" is deselected at 510 and when "Unlocked" is selected at 510, "Locked" is deselected at 508.

The "Detail Page" selection box at 512 may be selected to indicate that the template will be used as a detail page or deselected to indicate that the template will not be used as a detail page. A detail page can only be displayed as a secondary page, which means a general purpose template creator must specify that a question links to a given detail page. A non-detail page represents a general purpose template.

Figure 7:
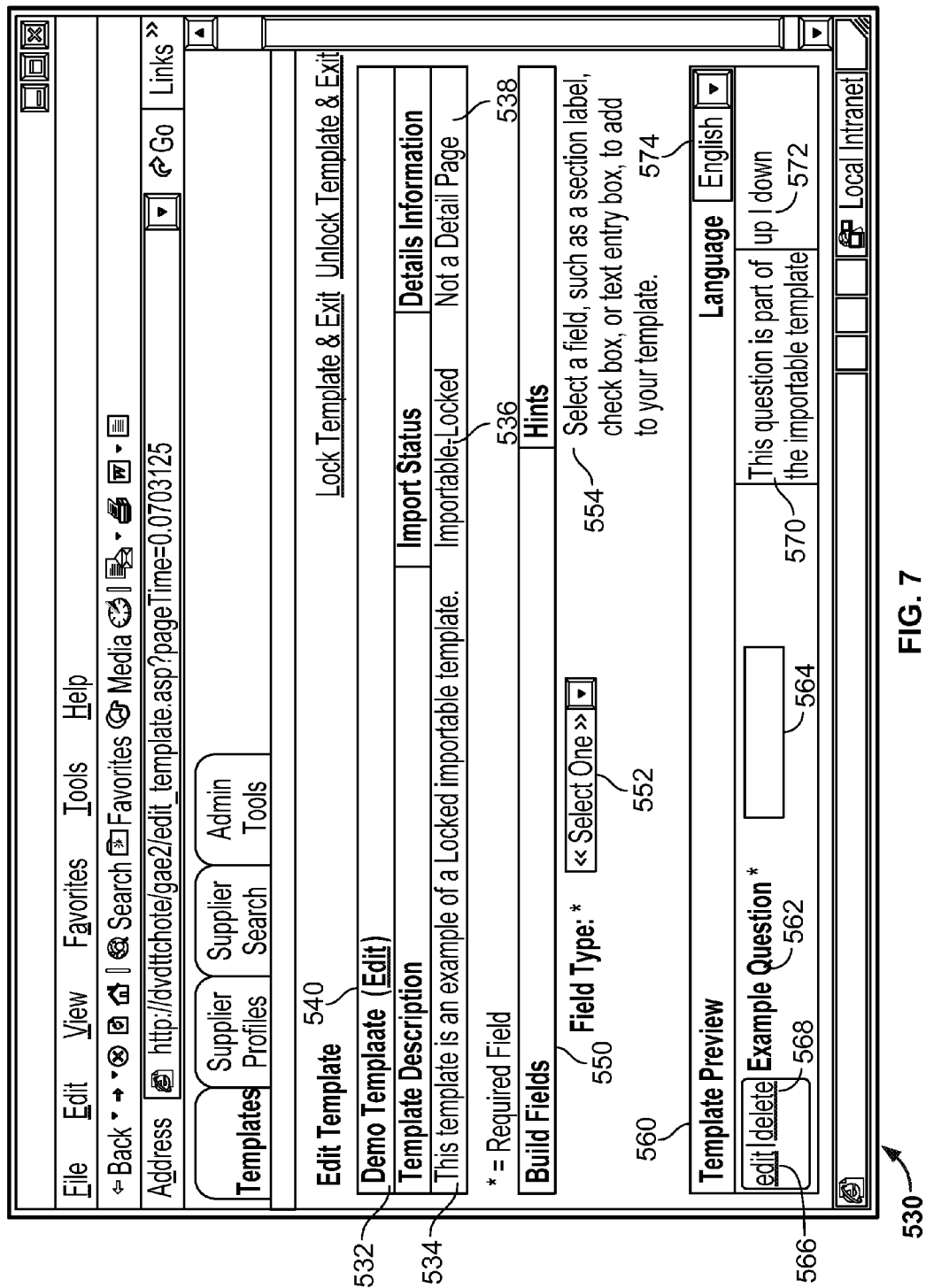
FIG. 7 is a sample template editing screen display that may be used to practice the embodiment of the invention of FIG. 6.

FIG. 7 is a sample template editing screen display 530 that may be used in conjunction with the embodiment of the present invention illustrated in FIG. 6. This screen 530 may be used to create template segments such as text and fields in a general purpose template or an importable template. The template editing screen 530 illustrated in FIG. 7 is based on the template created in the template creation screen display 500 of FIG. 6. In the template editing screen 530, information is displayed in the template block 540 and that information is drawn from the template creation screen 500: the template title is displayed at 532, the template description is displayed at 534, the import status is displayed at 536, and the detail information is displayed at 538. Fields are created in the "Build Fields" block 550. The type of field desired is selected from the "Field Type" pull down menu 552. In this embodiment, it is required that the person creating the template select a field type. Field types include checkbox, radio button, text box, geography, select list and min/max. A "Hints" area is provided to provide information to assist in selecting a field type.

For example, when creating a field for a template, a text field may be formed by selecting "text box" from the field types menu and then completing any additional fields that may appear. A select list, in which a responding entity would choose response data, may be formed by selecting "select list" from the field type menu.

A "Template Preview" box 560 is provided and depicts fields created for the template thus far. As may be seen at 562, the text field "Example Question *" has been created in the template and a response data field has been created at 564. At 566, an edit selection object is provided for the "Example Question *" field 562 and response data 564 field on the same line. The edit selection object 566 may be selected by a user and permits the user to edit the fields on the same line and to the right of that object 566, or in this example, the fields shown at 562 and 564. At 568, a delete selection function 568 is provided and may be selected by a user to delete the fields to the right of that function 568, or in this example, fields 562 and 564. At 570, a comment or hint may be provided by the template creator for display to the responding entity. In this example, the hint indicates that the associated fields 562 and 564 are part of an importable template. At 572, a scroll control function is included to permit the user to scroll up or down to view other fields. The language in which the template is to be displayed may be modified at a language drop down box 574 of the "Template Preview" box 560.

Figure 8:
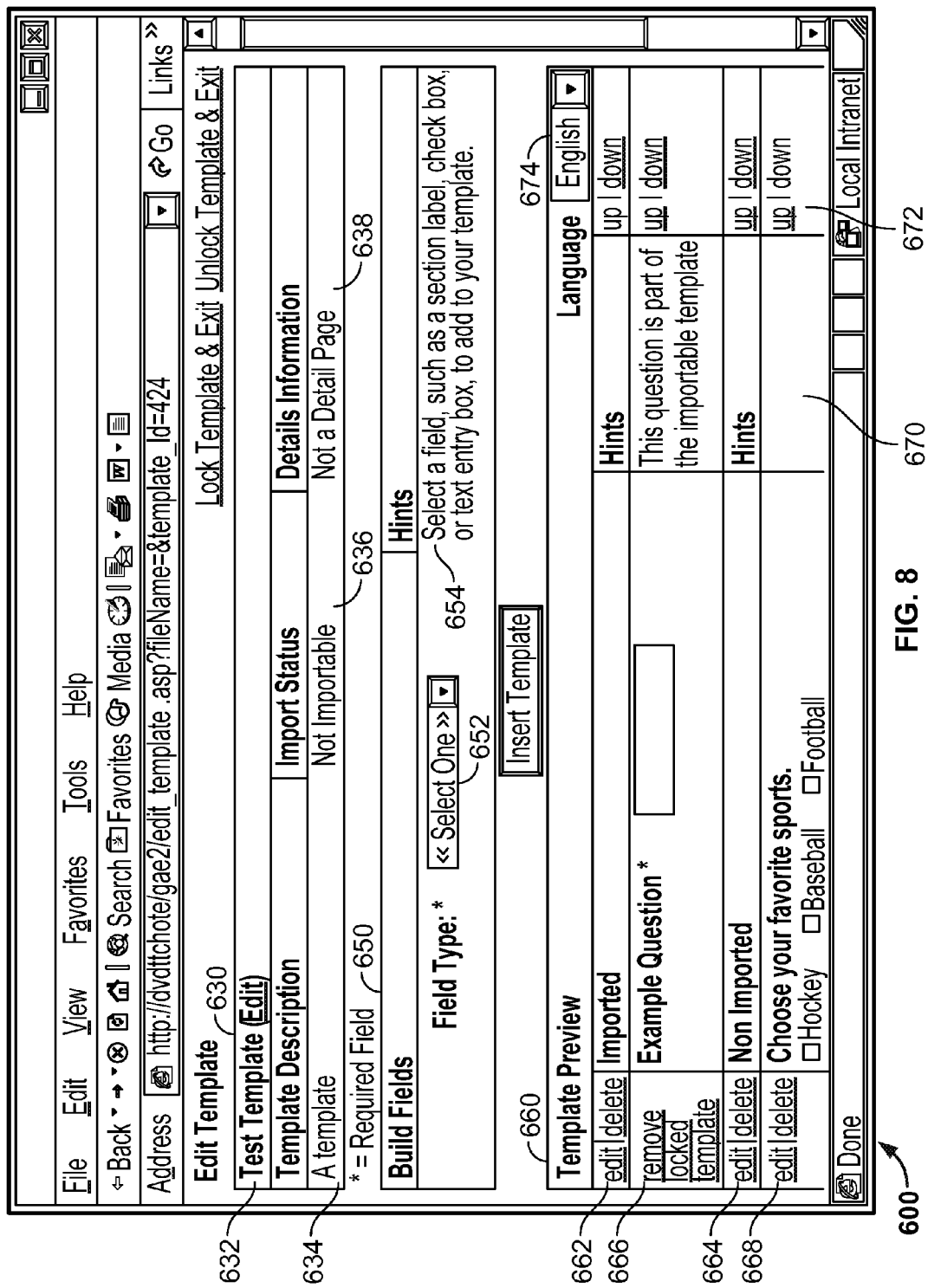
FIG. 8 is another sample template editing screen display.

FIG. 8 is a sample template editing screen display 600 that may be used to create fields in a general purpose template. This screen 600 may, moreover, be used to insert an importable template into a general purpose template. The template editing screen 600, displays a template title at 632, a template description at 634, an import status at 636, and detail information at 638 in a template description box 630. Fields are created in the "Build Fields" block 650 as they are in the "Build Fields" block 550 of screen 530.

A "Template Preview" box 660 is provided and depicts fields created for the general purpose template thus far. The "Template Preview" box 660 is divided into two sections, an imported element section 662 and a non-imported element section 664. One imported element 666, which is the same element created in the create new template screen 500 and the edit template screen 540, is illustrated. It should be noted that the imported element 666 provides only an option for removal of that element and does not permit editing of that element. This is because the imported element 666 is locked and, therefore, not editable. A non-imported element 668 is also depicted and may be either edited or deleted. Each of the elements, both imported and non-imported, may include "Hint" areas 670 and scroll areas 672. The language in which the template is to be displayed may also be modified at a language drop down box 674 of the "Template Preview" box 660.

When the template is created, a Search view is automatically generated for the template. Once a template is published (available for general use), the user may go to a search page and choose a template. A view of the template that will allow the user to search for data entered against the chosen template is provided. An example of a search algorithm is shown in Schemas 3-6 below. This algorithm uses Tables 1-7 above and stored procedures that exist in the database. Stored procedures are files that contain code that retrieves and manipulates data from a relational database.

Searches comprise multiple micro-queries, where each query is a combination of Template Id and Attribute ID and perhaps also Attribute Value. After each micro-query is processed, the server will return a list of owners. The server will then perform set operation and return a caller with either a union or intersection of those results. Schema 3 illustrates a stored procedure that implements micro-query.

Schema 3

```
ALTER procedure ap_AttrValueSearchByTemplIdAttrId_List_Intermed Results
    Returns intersection of set of OwnerIds that are already in
        #Owner
    and OwnerIds which satisfy the new @Where clause.
    counts on the existence of #Owner table that is created by
        caller
        @TemplateId int,
        @AttrId int,
        @RowCount int output
as
set nocount on
declare @tmp table (ownerid int)
declare @intersection table (ownerid int) declare @spid mt
set @spid=@@spid
if not exists(select spid from tempdb.dbo.IntermedResults
    where spid=@spid) begin
    insert into tempdb.dbo.IntermedResults (spid, OwnerId)
        select distinct @spid, OwnerId
        from AttrValueSearch (nolock)
        where TemplateId=@TemplateId
        and AttrId=@AttrId
    set @RowCount=@@Rowcount
    return
end
insert into @tmp
    select OwnerId
    from AttrValueSearch (nolock)
    where TemplateId=@TemplateId
    and AttrId=@AttrId
insert into @intersection(OwnerId)
select distinct tempdb.dbo.IntermedResults.ownerID
from tempdb.dbo.IntermedResults (nolock) inner join (select
    * from @tmp) tmp
on tempdb.dbo.IntermedResults.OwnerId=tmp.OwnerId
and tempdb.dbo.IntermedResults.spid=@spid
    truncate table #Owner
delete tempdb.dbo.IntermedResults
where spid=@spid
insert into tempdb.dbo.IntermedResults (spid, OwnerId)
```

The stored procedure of Schema 3 relies on a presence of InterMedResults static table created in TempDB, as shown in Schema 4.

Schema 4

```
CREATE TABLE[InterMedResults](
    [spid][int] NOT NULL, [OwnerId][int] NOT NULL,
        CONSTRAINT[PK _InterMedResults] PRIMARY KEY
        CLUSTERED
    (
    [spid],
    [OwnerId]
    ) ON[PRIMARY]
) ON[PRIMARY]
GO
```

In one embodiment, the procedure of Schema 4 will be executed from a new batch, as shown in Schema 5.

Schema 5

```
set nocount on
declare @rc int
exec ap _AttrValueSearchByTempIdAttrId_List_ IntermedResults 99, 333, @rc output if @rc=0 goto BATCH_END
exec ap _AttrValueSearchByTempIdAttrId_List_ IntermedResults 99, 333, @rc output if @rc=0 goto BATCH_END
exec ap _AttrValueSearchByTempIdAttrId_List_IntermedResults 99, 333, @rc output if @rc=0 goto BATCH_END
select ownerId from tempdb.dbo.InetrmedResults wherespid=@@spid BATCH_END:
delete tempdb.dbo.IntermedResults where spid=@@spid
```

Ohter Modification:

```
ALTER Proc_New_AttrSearch @TemplateID int, @TemplateId int, @Where varchar(1000), @NumMatching int
as
set nocount on
Declare @SQL varchar(2000)
select @SQL='
    select OwnerId, count (*) as NumMatching
        From AtrrValues_Comma
        where tempalateId='+convert(varchar(15), @TemplateId)+'
        and ('+@Where+')
    Group by OwnerId
    Having count(distinct AttrID)>='+convert(varchar(15), @NumMatching) Exec(@SQL)
```

Finally, multiple micro-criteria may be called with a single stored procedure call, as shown in Schema 6.

Schema 6

```
Exec_New_AttrSearch 200
    , '(AttrID=3422 and AttrValue>35) or (AttrID=2349 and AttrValue<333)'
    , 2
```

While the invention has been described in detail and with reference to specific embodiments thereof, it will be apparent to one skilled in the art that various changes and modifications can be made therein without departing from the spirit and scope thereof. In particular, it should be noted that while the templates described above have been described in the context of auctions, the templates may be used in any non-auction situations. Thus, it is intended that the present invention cover the modifications and variations of this invention provided they come within the scope of the appended claims and their equivalents.

What is claimed is:

1. A method, comprising:

merging, in a computer system, an importable electronic template having a text field and a response field, into a first and second general purpose template, respectively, to form a respective updated first general purpose template and updated second general purpose template;

providing, to a first potential auction participant and a second potential auction participant, the updated first general purpose template and updated second general purpose template, respectively;

receiving, from the first potential auction participant, a first response associated with the response field as merged into the updated first general purpose template;

receiving, from the second potential auction participant, a second response associated with the response field as merged into the updated second general purpose template;

qualifying at least one of the first and the second potential auction participants as an actual participant in a first auction, prior to commencement of the first auction, wherein the qualification is based at least in part on the respective first and second responses;

automatically updating, in the computer system, both the updated first general purpose template and the updated second general purpose template into a respective first revised general purpose template and a second revised general purpose template, in response to receipt in the computer system of a modification to the importable electronic template; and qualifying at least one of the first and the second potential auction participants as an actual participant in a second auction, prior to commencement of the second auction, based at least in part on the respective revised first general purpose template and the revised second general purpose template.

2. The method of claim 1, further comprising storing the received responses in a database.

3. The method of claim 1 wherein the importable electronic template is merged into the first general purpose electronic template by inputting a reference associated with the importable electronic template having a location in a data storage device in which the importable electronic template is stored.

4. The method of claim 1 wherein the qualifying includes executing a search of the received responses.

5. The method of claim 1 further comprising storing the text field in a memory device as Extensible Markup Language code.

6. The method of claim 1 further comprising storing the text field in a relational database.

7. The method of claim 1 further comprising preventing modifications to the text field.

8. A system, comprising:
a communication interface;
a processor configured to:
merge an importable electronic template having a text field and a response field, into a first and second general purpose template, respectively, to form a respective updated first general purpose template and updated second general purpose template;
provide, to a first potential auction participant and a second potential auction participant, the updated first general purpose template and updated second general purpose template, respectively;
receive, from the first potential auction participant, a first response associated with the response field as merged into the updated first general purpose template;
receive, from the second potential auction participant, a second response associated with the response field as merged into the updated second general purpose template;
qualify at least one of the first and the second potential auction participants as an actual participant in a first auction, prior to commencement of the first auction, wherein the qualification is based at least in part on the respective first and second responses;
automatically update both the updated first general purpose template and the updated second general purpose template into a respective first revised general purpose template and a second revised general purpose template, in response to receipt of a modification to the importable electronic template; and
qualify at least one of the first and the second potential auction participants as an actual participant in a second auction, prior to commencement of the second auction, based at least in part on the respective revised first general purpose template and the revised second general purpose template; and a memory coupled to the processor and configured to provide the processor with instructions.

9. The system of claim 8 further comprising a database configured to store the received responses.

10. The system of claim 8 wherein the importable electronic template is merged into the first general purpose electronic template by inputting a reference associated with the importable electronic template having a location in a data storage device in which the importable electronic template is stored.

11. The system of claim 8 wherein the processor is further configured to receive a modification to the response field.

12. The system of claim 8 wherein the processor is configured to qualify at least in part by executing a search of the received responses.

13. The system of claim 8 wherein the processor is further configured to store the text field in a memory device as Extensible Markup Language code.

14. The system of claim 8 wherein the processor is further configured to store the text field in a relational database.

15. The system of claim 8 wherein the processor is further configured to prevent modifications to the text field.

16. A non-transitory computer readable storage medium, the medium comprising computer instructions, which when executed, cause a computer to:
merge an importable electronic template having a text field and a response field, into a first and second general purpose template, respectively, to form a respective updated first general purpose template and updated second general purpose template;
provide, to a first potential auction participant and a second potential auction participant, the updated first general purpose template and updated second general purpose template, respectively;
receive, from the first potential auction participant, a first response associated with the response field as merged into the updated first general purpose template;
receive, from the second potential auction participant, a second response associated with the response field as merged into the updated second general purpose template;
qualify at least one of the first and the second potential auction participants as an actual participant in a first auction, prior to commencement of the first auction, wherein the qualification is based at least in part on the respective first and second responses;
automatically update both the updated first general purpose template and the updated second general purpose template into a respective first revised general purpose template and a second revised general purpose template, in response to receipt of a modification to the importable electronic template; and
qualify at least one of the first and the second potential auction participants as an actual participant in a second auction, prior to commencement of the second auction, based at least in part on the respective revised first general purpose template and the revised second general purpose template.

17. The computer readable storage medium of claim 16 further comprising computer instructions, which when executed, cause a computer to store the received responses in a database.

18. The computer readable storage medium of claim 16 wherein the importable electronic template is merged into the first general purpose electronic template by inputting a reference associated with the importable electronic template having a location in a data storage device in which the importable electronic template is stored.

19. The computer readable storage medium of claim 16 further comprising computer instructions, which when executed, cause a computer to receive a modification to the response field.

20. The computer readable storage medium of claim 16 further comprising computer instructions, which when executed, cause a computer to qualify at least in part by executing a search of the received responses.

21. The computer readable storage medium of claim 16 further comprising computer instructions, which when executed, cause a computer to store the text field in a memory device as Extensible Markup Language code.

22. The computer readable storage medium of claim 16 further comprising computer instructions, which when executed, cause a computer to store the text field in a relational database.

23. The computer readable storage medium of claim 16 further comprising computer instructions, which when executed, cause a computer to prevent modifications to the text field.

\* \* \* \* \*